United States Patent
Soghomonian et al.

(10) Patent No.: US 6,727,629 B1
(45) Date of Patent: Apr. 27, 2004

(54) ROTARY ELECTRIC MOTOR HAVING A PLURALITY OF SHIFTED STATOR POLES AND/OR ROTOR POLES

(75) Inventors: Zareh Soghomonian, Sterling, VA (US); Boris A. Maslov, Reston, VA (US); Mark A. Benson, Leesburg, VA (US)

(73) Assignee: Wavecrest Laboratories, LLC, Dulles, VA (US)

( * ) Notice: Subject to any disclaimer, the term of this patent is extended or adjusted under 35 U.S.C. 154(b) by 39 days.

(21) Appl. No.: 10/160,254

(22) Filed: Jun. 4, 2002

(51) Int. Cl.$^7$ ................................................. H02K 1/12
(52) U.S. Cl. .................. 310/254; 310/156.12; 310/112
(58) Field of Search ........................... 310/112, 49 R, 310/254, 216, 217, 218, 156.25

(56) References Cited

U.S. PATENT DOCUMENTS

| | | | |
|---|---|---|---|
| 3,549,918 A | * 12/1970 | Croymans et al. | 310/49 R |
| 4,786,834 A | 11/1988 | Grant et al. | 310/194 |
| 4,864,176 A | 9/1989 | Miller et al. | 310/194 |
| 5,854,521 A | * 12/1998 | Nolle | 310/12 |
| 5,936,325 A | * 8/1999 | Permuy | 310/162 |
| 6,153,953 A | * 11/2000 | Isozaki et al. | 310/49 R |
| 6,181,035 B1 | 1/2001 | Acquaviva | 310/51 |
| 6,188,159 B1 | 2/2001 | Fan | 310/254 |
| 6,204,587 B1 | * 3/2001 | Torok et al. | 310/181 |
| 6,252,323 B1 | * 6/2001 | Nishikawa et al. | 310/156.01 |

FOREIGN PATENT DOCUMENTS

| | | | |
|---|---|---|---|
| EP | 1 005 136 | 5/2000 | H02K/1/37 |
| EP | 1 052 761 | 11/2000 | H02K/21/14 |
| JP | 2002-153027 | 5/2002 | H02K/16/00 |
| WO | WO 02/19504 | 3/2002 | H02K/21/00 |

OTHER PUBLICATIONS

Zhu Z Q et al., "Influence of Design Parameters on Cogging Torque in Permanent Magnet Machines", IEEE Transactions on Energy Conversion, IEEE Inc. New York, US, vol. 15, NR 4, pp. 407–412.

"Study of Cogging Torque in Permanent Magnet Machines", C. Studer, A. Keyhani, The Ohio State University, and T. Sebastian, S. Murthy, Saginaw Steering Systems, Delphi, Saginaw, MI, date unknown.

Technical Report, "Study of Cogging Torque in Permanent Magnet Machines", C. Studer and A. Keyani, The Ohio State University, 1998.

"Shape Optimization for Electromagnetic Devices" date unknown.

* cited by examiner

Primary Examiner—Nicholas Ponomarenko
Assistant Examiner—Nguyen Hanh
(74) Attorney, Agent, or Firm—McDermott, Will & Emery (57) ABSTRACT

A rotary electric motor has a stator with a plurality of axially spaced sets of corresponding stator and rotor elements. The stator of each set is an annular ring with poles circumferentially positioned about an axis of rotation. The rotor of each set has a plurality of permanent magnets disposed circumferentially along an annular air gap opposite the stator poles. The permanent magnets of adjacent rotor element sets and/or the poles of adjacent stator sets are offset from each other in the axial direction to cancel the effects of cogging torque produce by each of the sets.

14 Claims, 7 Drawing Sheets

ROTARY ELECTRIC MOTOR HAVING A PLURALITY OF SHIFTED STATOR POLES AND/OR ROTOR POLES

RELATED APPLICATIONS

This application contains subject matter related to copending U.S. application Ser. No. 09/571,174 of Pyntikov et al., filed May 16, 2000, copending U.S. application Ser. No. 09/826,423 of Maslov et al., filed Apr. 5, 2001, copending U.S. application Ser. No. 09/826,422 of Maslov et al., filed Apr. 5, 2001, U.S. application Ser. No. 09/966,101 of Maslov et al., filed Oct. 1, 2001, copending U.S. application Ser. No. 10/067,305 of Maslov et al., filed Feb. 7, 2002, and copending U.S. application Ser. No. 10/160,257 of Maslov et al., filed Jun. 4, 2002, all commonly assigned with the present application. The disclosures of these applications are incorporated by reference herein.

FIELD OF THE INVENTION

The present invention relates to rotary electric motors, more particularly to permanent magnet motors comprising a plurality of axially spaced rotor and stator poles, the axially spaced rotor magnets or stator magnets being shifted from axial alignment with each other.

BACKGROUND

The above-identified copending related U.S. patent application of Maslov et al., Ser. No. 09/826,423, identifies and addresses the need for an improved motor amenable to simplified manufacture and capable of efficient and flexible operating characteristics. In a vehicle drive environment, for example, it is highly desirable to attain smooth operation over a wide speed range, while maintaining a high torque output capability at minimum power consumption. Such a vehicle motor drive should advantageously provide ready accessibility to the various structural components for replacement of parts at a minimum of inconvenience. The above-identified copending related U.S. applications describe formation of electromagnet core segments as isolated magnetically permeable structures configured in an annular ring. With such arrangements, flux can be concentrated to provide advantageous effects as compared with prior art embodiments.

As described in the above-identified Maslov et al. applications, isolation of the electromagnet core segments permits individual concentration of flux in the magnetic cores, with a minimum of flux loss or deleterious transformer interference effects with other electromagnet members. Operational advantages can be gained by configuring a single pole pair as an isolated electromagnet group. Magnetic path isolation of the individual pole pair from other pole groups eliminates a flux transformer effect on an adjacent group when the energization of the pole pair windings is switched. The lack of additional poles within the group avoids any such effects within a group. Further benefits are described from utilization of three dimensional aspects of motor structure, such as a structural configuration wherein axially aligned stator poles and axially aligned rotor magnets provide highly concentrated flux density distribution in the active air gap of the machine. Such configuration provides a greater number of poles with the same individual active air gap surface areas and/or greater total active air gap surface area than conventional motors having the same air gap diameter.

In addition to benefits of flux concentration obtainable with the configurations described above, recently introduced neodymium-iron-boron (NdFeB) magnetic materials can produce larger flux densities than other permanent magnetic materials previously used in brushless machines, thus increasing torque output capacity. The use of high density producing permanent magnets in motors which comprise a great number of poles presents a concern for ameliorating undesired effects that can be introduced by cogging torque. Cogging torque is produced by magnetic attraction between the rotor mounted permanent magnets and those stator poles that are not in a selectively magnetized state. This attraction tends to move the rotor magnet to an equilibrium position opposite a stator pole to minimize the reluctance therebetween. As the rotor is driven to rotate by energization of the stator, the magnitude and direction of the cogging torque produced by magnet interaction with non-energized electromagnet segments changes periodically to oppose and increase the torque produced by the energized stator segments. In the absence of compensation, cogging torque can change direction in an abrupt manner with the rotation of the rotor. If cogging torque is of significant magnitude, it becomes a rotational impediment, as well as a source of mechanical vibration that is detrimental to the objectives of precision speed control and smooth operation.

Figure 1:
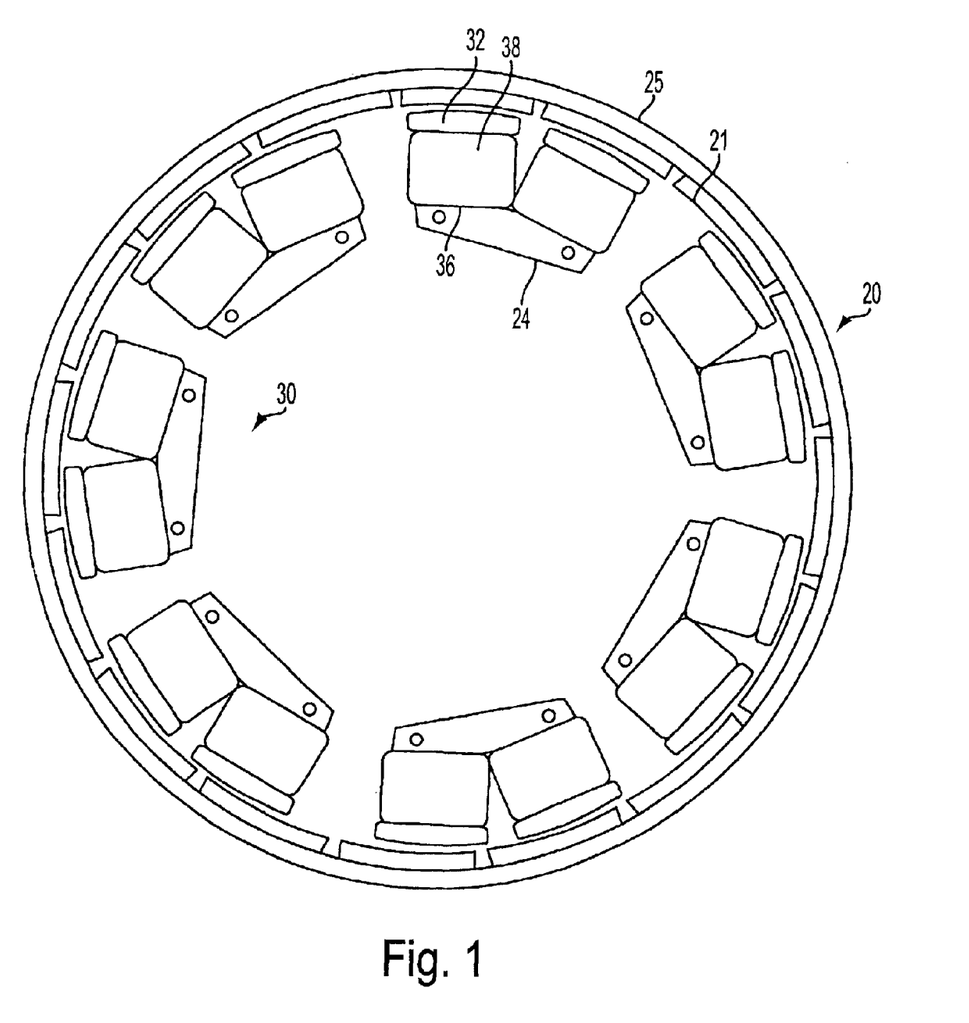
FIG. 1 is an exemplary view showing rotor and stator elements of a motor such as disclosed in the copending application Ser. No. 09/826,422.

As an illustration of the development of cogging torque, a motor such as disclosed in the copending application Ser. No. 09/826,422, is considered. The disclosure of that application has been incorporated herein. FIG. 1 is an exemplary view showing rotor and stator elements. Rotor member 20 is an annular ring structure having permanent magnets 21 substantially evenly distributed along cylindrical back plate 25. The permanent magnets are rotor poles that alternate in magnetic polarity along the inner periphery of the annular ring. The rotor surrounds a stator member 30, the rotor and stator members being separated by an annular radial air gap. Stator 30 comprises a plurality of electromagnet core segments of uniform construction that are evenly distributed along the air gap. Each core segment comprises a generally u-shaped magnetic structure 36 that forms two poles having surfaces 32 facing the air gap. The legs of the pole pairs are wound with windings 38, although the core segment may be constructed to accommodate a single winding formed on a portion linking the pole pair. Each stator electromagnet core structure is separate, and magnetically isolated, from adjacent stator core elements. The stator elements 36 are secured to a non-magnetically permeable support structure, thereby forming an annular ring configuration. This configuration eliminates emanation of stray transformer flux effects from adjacent stator pole groups.

Figure 2:
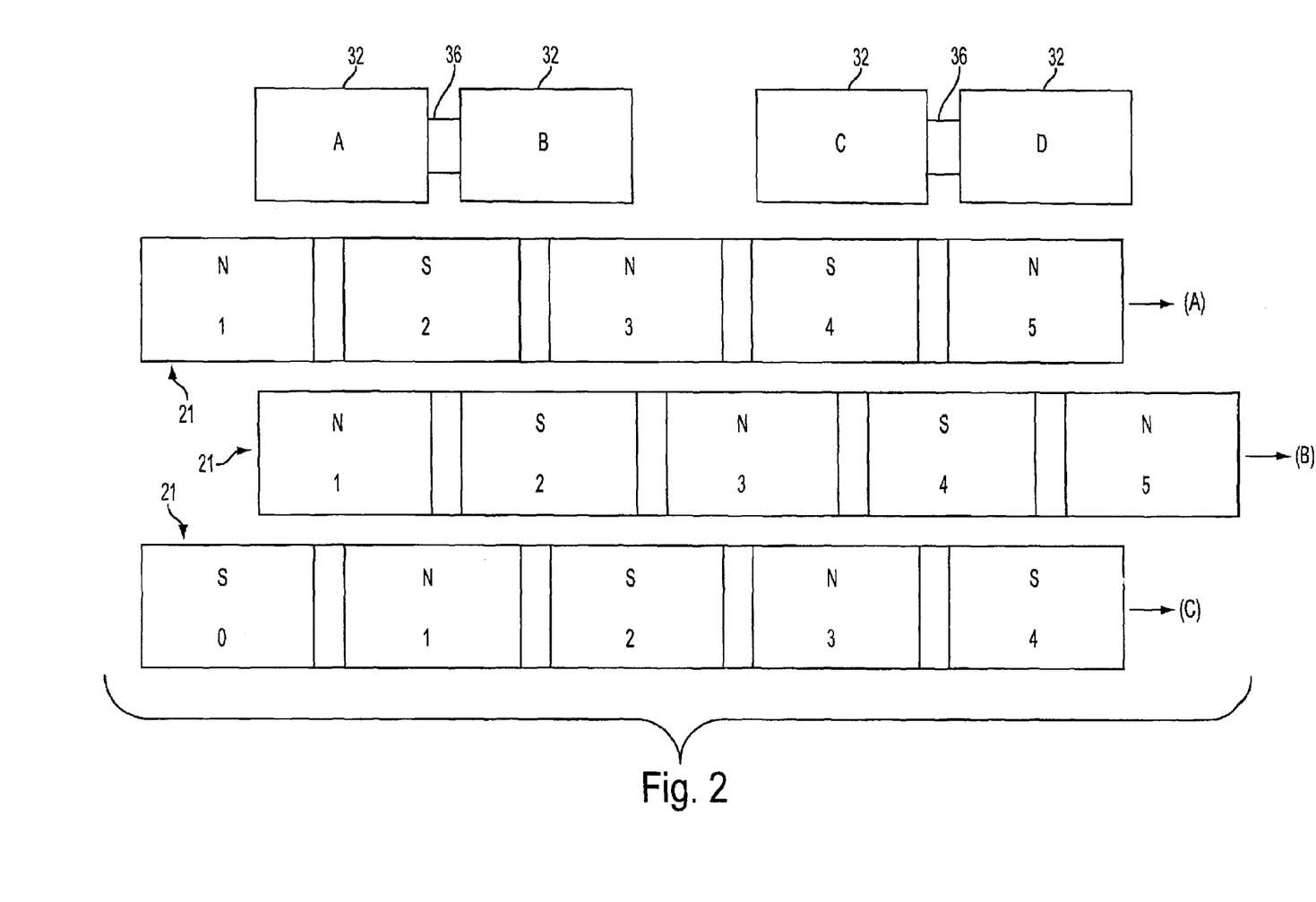
FIG. 2 is a partial plan layout of elements of FIG. 1 illustrating relative positions of stator pole surfaces and rotor surfaces for three instants of time during motor operation.

FIG. 2 is a partial plan layout of two adjacent stator core elements 36, with pole faces 32 denominated A-D, in relation to the rotor magnets, denominated 0–5, during motor operation. The positions of the rotor magnets are depicted at (A)–(C) for three instants of time ($t_1$–$t_3$) during a period in which the rotor has moved from left to right. At time $t_1$, the winding for the A-B stator pole pair is energized with current flowing in a direction to form a strong south pole at A and a strong north pole at B. The winding for the C-D stator pole pair is not energized. The position of the rotor is shown at (A). North magnet 1 and south magnet 2 overlap stator pole A. South magnet 2 and north magnet 3 overlap stator pole B. At this time magnet 3 is approaching an overlapping position with pole C. South magnet 4 is in substantial alignment with pole C and north magnet 5 is in substantial alignment with pole D. At this time motoring torque is produced by the force of attraction between south pole A and north pole magnet 1, the force of attraction between north pole B and south pole magnet 2, and the force of repulsion between north pole B and north pole magnet 3. Poles C and D have respective weak north and south magnetization caused by the attraction of magnets 4 and 5. This attraction, which seeks to maintain minimum reluctance is in opposition to motor driving torque.

At time $t_2$, the rotor has moved to the position shown at (B). The energization of the pole pair A-B windings has been commutated off. Windings of the C-D pole pair are not energized. Magnets 1 and 2 are substantially in alignment with poles A and B respectively. North magnet 3 and south magnet 4 overlap pole C. South magnet 4 and north magnet 5 overlap pole D. Poles A and B have weak south and north magnetization respectively. The stator poles C and D are influenced by both north and south rotor magnets. Pole C is in a flux path between north pole magnet 3 and south pole magnet 4. Pole D is in a flux path between south pole magnet 4 and north magnet pole 5. A cogging torque thus has developed that opposes the motor driving torque and changes in magnitude as the rotor magnets move from direct alignment with the non-energized stator poles to partial alignment At time $t_3$, the rotor has moved to the position shown at (C). Energization of the A-B pole pair windings has been reversed, causing a strong north pole at pole A and a strong south pole at B. Windings of the C-D pole pair are not energized. North magnet 1 and south magnet 2 overlap stator pole B. South magnet 0 and north magnet 1 overlap stator pole A. At this time south magnet 2 is approaching an overlapping position with pole C. North magnet 3 is in substantial alignment with pole C and south magnet 4 is in substantial alignment with pole D.

As described above, the opposing cogging torque effects motoring torque in a manner that varies with respect to rotational angular position as the rotation proceeds. The cogging torque is most pronounced at transitional points when a rotor magnet is about to face a stator pole across the air gap. An abrupt change in the cogging torque takes place as the leading edge of the generally rectangular surface of a permanent magnet approaches the parallel edge of the rectangular stator pole. Use of high energy density permanent magnet materials such as neodymium-iron-boron (NdFeB) magnetic materials, which impart large flux densities at the air gap in the vicinities of the rotor permanent magnets, heightens this effect to the extent that undesirable vibration can become noticeable. Motors having a large number of stator poles and rotor poles, such as the axially aligned rows of stator poles and rotor magnets, can produce even greater cogging torque effects. In the same manner, cogging torque is produced to a varying extent in motors having unitary stator cores.

A variety of techniques have been utilized to minimize the effects of cogging torque. Such techniques attempt to reduce the rate of reluctance change with respect to rotor position, reduce the magnetic flux in the machine, or shift poles in a unitary stator core such that the cogging torque produced by the individual poles tend to cancel one another. Electronic methods can be used to control the intensity of the electromagnetic interaction that takes place between permanent magnet and electromagnet surfaces. Such methods have disadvantages in that they involve complex control algorithms that are implemented simultaneously with motor control algorithms and tend to reduce the overall performance of the motor. Reduction of magnetic flux diminishes advantages obtained from the newer permanent magnet materials and the flux concentration techniques of the above-identified copending applications. Shifting the location of poles in a conventional unitary stator core structure poses limitations on the size, positions and number of poles, which can prevent an arrangement that provides optimal operation.

Other approaches involve modifying the construction of the machine by changing the shape of the stator poles. Prior art stator poles conventionally made of stacked laminations are not readily amenable to modification. Available lamination machining processes are limited in the ability to reshape conventional patterns, especially three-dimensionally. A substantial range of modification of such laminated structures is too complex and costly to be feasible.

The need thus exists for effective cogging compensation in motors, particularly those having high flux density magnitudes and concentrations, and do not detract from the efficient operation and control capability of the motors while providing practicability of cost and application.

Copending application addresses this need by shaping stator pole surfaces or rotor magnet surfaces so that the stator pole surface geometric configuration and the rotor magnet surface geometric configuration are skewed with respect to each other. The effect of the skewing arrangement is to dampen the rate of change of cogging torque that is produced by the interaction between a rotor magnet and a pole of a non-energized stator electromagnet as the permanent magnet traverses its rotational path. The ability to selectively shape stator poles is made feasible through the use of core materials such as a soft magnetically permeable medium that is amenable to formation of a variety of particularized shapes. For example, core material may be manufactured from soft magnet grades of Fe, SiFe, SiFeCo, SiFeP powder material, each of which has a unique power loss, permeability and saturation level. These materials can be formed initially in any desired three dimensional configuration, thus avoiding the prospect of machining an already formed hard lamination material.

Minimization of cogging torque effects without detrimentally affecting torque output capability continues to be an important objective.

DISCLOSURE OF THE INVENTION

The present invention fulfills this need, at least in part, by offsetting the effects of cogging torque produced in a plurality of axially spaced sets of rotor and stator elements. Further advantages are achieved from the use of soft magnetically permeable materials for the formation of stator core structures. Core geometries and core dimensions of stator elements, with relevant tolerances, can be formed without the need to form laminations and thus can be made to optimize the magnetic potential gradient developed between coupled poles of rotor permanent magnets and stator electromagnets.

An advantage of the present invention is that the poles of each separate axially disposed stator core may be offset with respect to each other in the axial direction to cancel the effects of cogging torque without limiting the positional relationships among the stator poles in the circumferential direction.

A further advantage of the present invention is that rotor permanent magnets, which are arrayed in the circumferential and axial directions may be offset with respect to each other in the axial direction to cancel the effects of cogging torque without limiting the total number of permanent magnets or their positions in the circumferential direction.

The structural features of the invention are embodied in a motor that comprises a rotor and stator each disposed in an angular ring configuration and spaced from each other by an annular radial air gap. Preferably, the stator comprises a plurality of separate integral electromagnet core segments disposed coaxially about an axis of rotation. Each core segment comprises two or more poles integrally linked together. A winding is formed on the linking portion to develop, when energized with current, magnetic poles of opposite polarity in adjoining stator poles.

The stator core segments are affixed to a non-ferromagnetic support structure and distributed in the stator ring without ferromagnetic contact with each other. Thus a core segment having a non-energized winding will not have flux produced therein by energization of the winding of another, ferromagnetically isolated, core segment. The non-energized electromagnet core section, however, will be affected by the flux created by movement of a rotor permanent magnet as it approaches and passes the air gap portion facing the stator poles.

In accordance with one aspect of the present invention, each of the core segments comprises a plurality of poles integrally joined by a linking portion that is generally parallel to the axis of rotation. The electromagnet core segments preferably are formed of powdered metal material. The poles of each stator core segment are offset from each other in the axial direction. The stator poles all have a common surface geometric configuration at the air gap. The rotor comprises a plurality of permanent magnets with surfaces that face the air gap, the surfaces having a common geometric configuration. Each permanent magnet is a magnetic dipole having one magnetic polarity at the surface facing the air gap and the opposite magnetic polarity at a surface facing away from the air gap, thereby forming a magnetic polar orientation in a direction perpendicular to the air gap. The permanent magnets have a common surface geometric configuration that may be the same as the stator poles and are aligned in axial rows disposed circumferentially along the air gap. Each rotor permanent magnet is of an opposite magnetic polarity to the magnetic polarity of adjacent permanent magnets in its respective ring and axial row.

The effect of the shifting of poles in the axial direction is the significant cancellation of the cogging torque produced at each transition between rotor magnet and stator pole, as the transitions at axially adjacent elements are offset. Maximum flux linkage between overlapping rotor magnets and stator poles can be maintained to maximize the motoring torque capacity. Cogging torque can be further compensated by additionally skewing and shaping the geometric configuration of the stator pole with respect to the axis of rotation. Reference is made to the copending application for further description of benefits of skewing and pole shaping.

A variation of the invention may be realized by offsetting the permanent magnets in adjacent axially spaced rings from each other in the axial direction. The stator poles of each stator core may be in axial alignment, as the transitions between magnets and stator poles at axially adjacent elements will be offset by virtue of the rotor magnet positions. As a further variation, the stator core segment poles may have a common surface geometric configuration at the air gap and the permanent magnet surfaces may have a common geometric configuration different from the stator pole surface geometric configuration.

Additional advantages of the present invention will become readily apparent to those skilled in this art front the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 3:
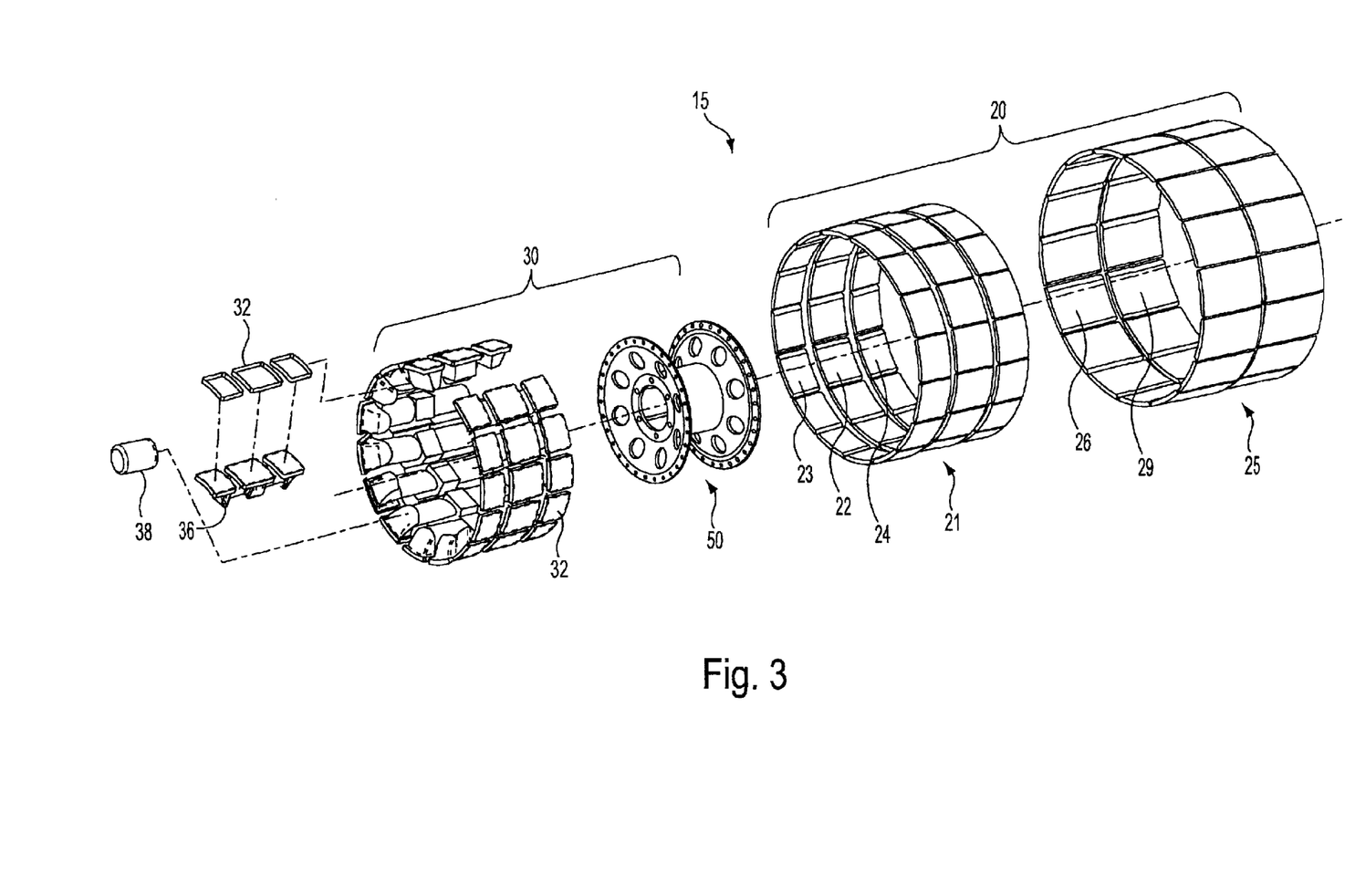
FIG. 3 illustrates a three-dimensional exploded view of a motor such as disclosed in copending application.

The concepts of the present invention are applicable to motors having two or more axially spaced sets of rotor and stator elements. For the purpose of understanding structural interrelationships among stator and rotor elements, FIG. 3 illustrates a three-dimensional exploded view of a motor such as disclosed in copending application. Motor 15 comprises annular permanent magnet rotor 20 and annular stator structure 30 separated by a radial air gap. A plurality of ferromagnetically isolated stator core segment elements 36, made of magnetically permeable material, are supported by support structure 50, which maintains ferromagnetic isolation of the segments. Segment 36 is an integral structure formed of a magnetically permeable material with pole surfaces 32 facing the air gap. The pole faces of each core segment may have different surface areas, as shown, or may have identical surface configuration. Each stator core element 36 is an electromagnet including windings 38 formed on the core material. Reversal of the direction of energizing current, in known manner, effects reversal of the magnetic polarities of each of the poles. The rotor comprises a permanent magnet section 21 with three axially spaced rings of rotor magnets 22–24, circumferentially distributed about the air gap, and a back iron ring 25 upon which the permanent magnets are mounted. Stator support structure 50 may be affixed to a stationary shaft, the rotor mounted within a housing that is journalled to the shaft through appropriate bushings and bearings.

Figure 4:
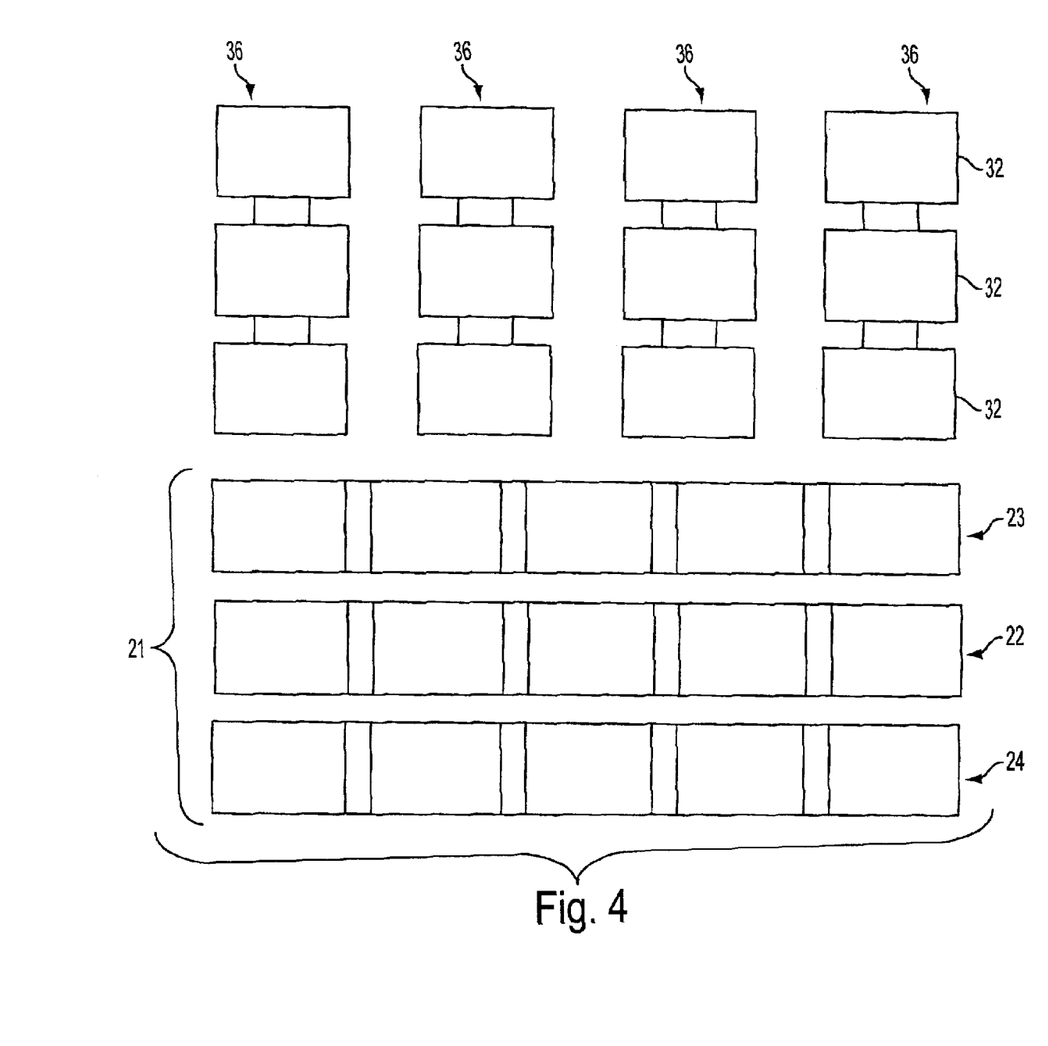
FIG. 4 is a partial plan layout of stator pole and rotor permanent magnet surfaces of a motor such as shown in FIG. 3

FIG. 4 is a partial plan layout of stator pole and rotor permanent magnet surfaces of a motor such as shown in FIG. 3, taken with the rotor at rest. The upper portion of the figure depicts four adjacent stator elements 36, each comprising three stator poles having surfaces 32. The lower portion of the figure depicts portions of three axially spaced rotor rings having magnets 21. The stator and rotor elements, which in actual construction are disposed circumferentially around the axis of rotation, are laid out on the horizontal planar surface to illustrate their spatial relationships across the air gap, represented by the horizontal space therebetween. The axis of rotation is in the vertical direction. In actual construction, the upper row of stator poles are aligned across the air gap with the lower row of rotor magnets, the center row of stator poles are aligned across the air gap with the center row of rotor magnets, and the lower row of stator poles are aligned across the air gap with the upper row of rotor magnets. When the motor is in running operation, cogging torque is produced in each of the aligned rows of stator poles and rotor magnets in the manner discussed above and illustrated in FIG. 2. As all of the stator poles in each segment are in axial alignment with each other and the adjacent rotor magnets in each spaced ring of magnets are in axial alignment with each other, the corresponding rows of stator poles and rotor magnets produce the same cogging torque variations and are additive.

Figure 5:
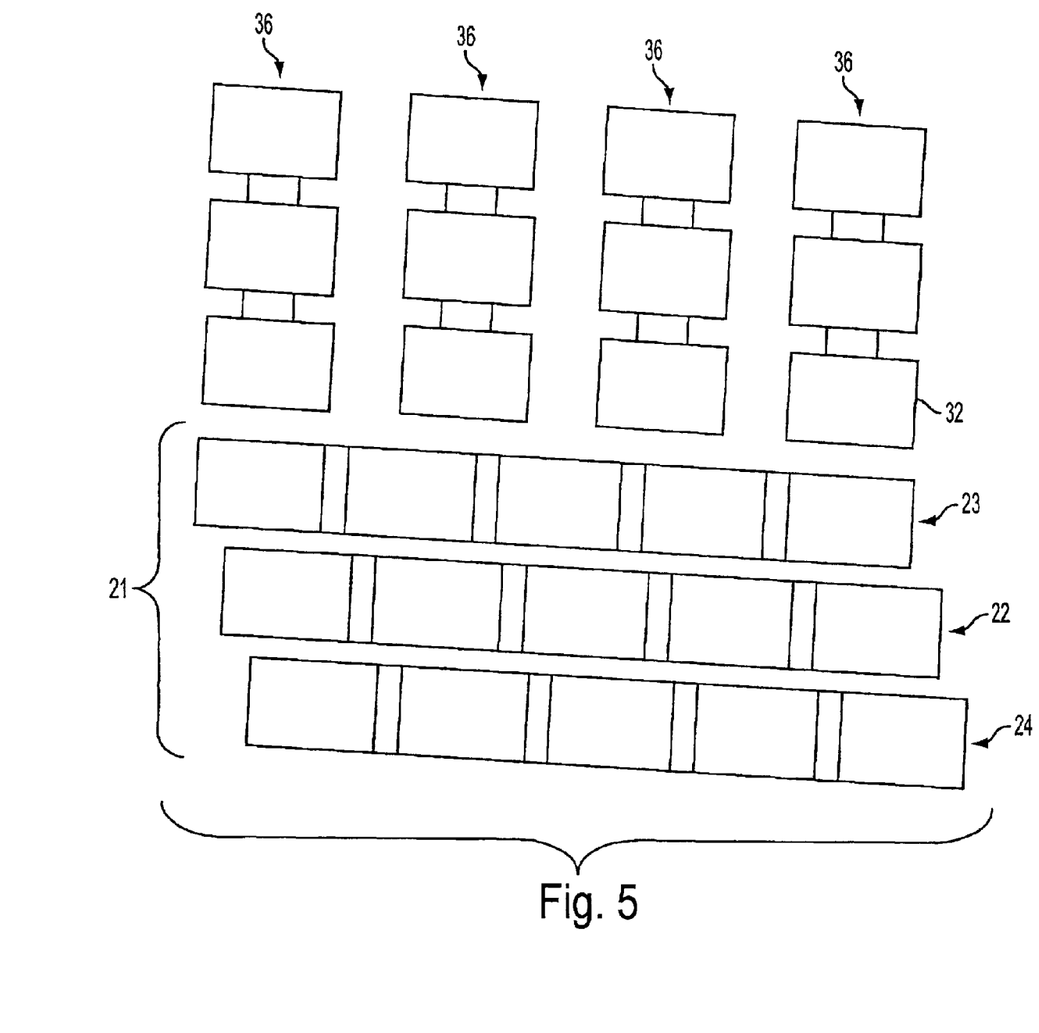
FIG. 5 is a partial plan layout of stator pole and rotor permanent magnet surfaces of a motor in accordance with the present invention.

FIG. 5 is a partial plan layout of stator pole and rotor permanent magnet surfaces of a motor in accordance with the present invention. Supporting structure for the elements shown may be similar to that depicted in FIG. 3. Stator segments 36 are aligned in the direction of the axis of rotation and are disposed circumferentially around the axis of rotation. All of the stator poles in each segment are in axial alignment with each other. In this illustration, all stator poles surfaces have the same geometric configuration and dimensions. Axially spaced rotor rings 22–24 also are disposed circumferentially around the axis of rotation. As shown, all of the magnet surfaces have the same geometric configuration and dimensions. Magnets in adjacent rings, however, are shifted from each other in the axial direction.

During motor operation the rotor traverses a horizontal path with respect to the stationary stator segments. The alignment transitional points between rotor magnets and stator poles of a corresponding rotor ring/stator pole set occur at positions along the circumference and at times that are different from each of the other sets of corresponding rotor and stator elements. Thus, while each set produces a similar time varying cogging torque, the cogging torques are shifted from each in relation to the offset of the rotor magnets. The cogging torques, to a variable extent cancel each other, so that the combined cogging torque effect can be minimal. The dimensions of the stator poles of each core segment and/or the dimensions of the rotor magnets need not be identical but can vary as depicted, for example, in the arrangement of FIG. 3. The degree of offset can be appropriately selected for optimum effect in consideration of dimensional characteristics.

Figure 6:
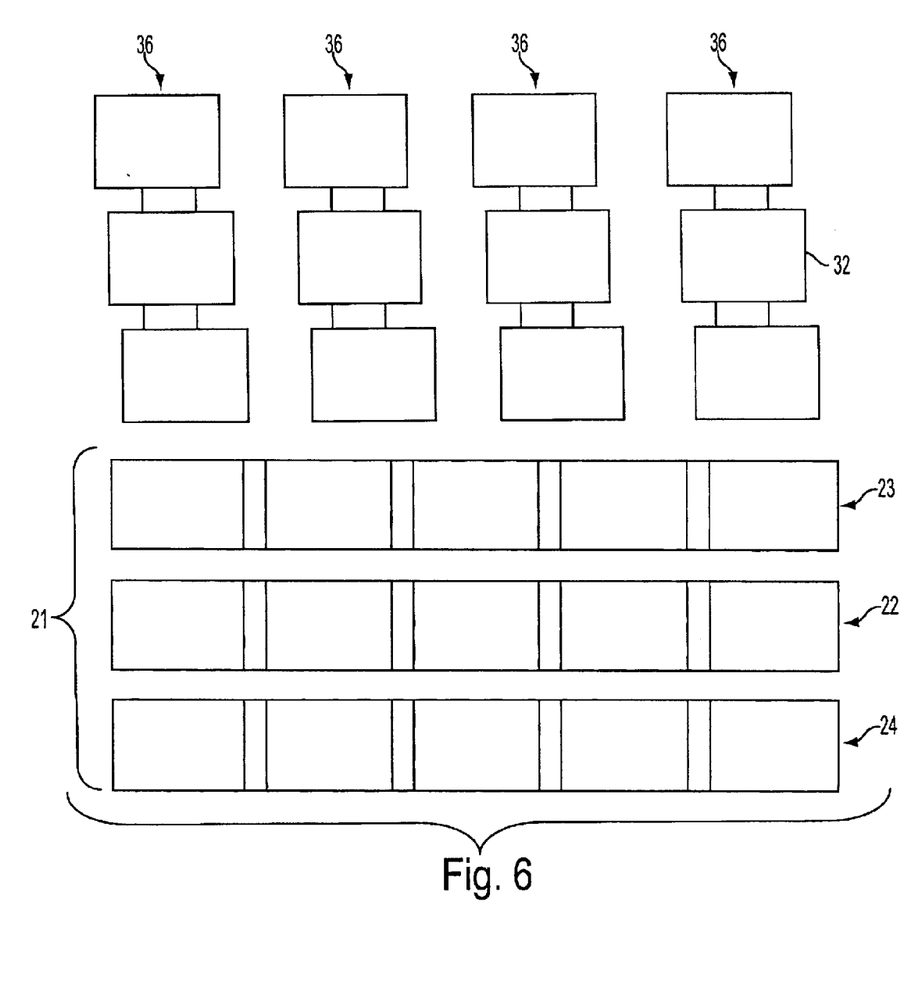
FIG. 6 is a partial plan layout of stator pole and rotor permanent magnet surfaces of a motor in accordance with another aspect of the present invention.

FIG. 6 is a partial plan layout of stator pole and rotor permanent magnet surfaces of a motor in accordance with another aspect of the present invention. Supporting structure for the elements shown may be similar to that depicted in FIG. 3. Rotor 21 comprises three sets of axially spaced permanent magnet rings 22–24. The magnets in adjacent rings have substantially the same surface dimensions and are in axial alignment with each other. Stator segments 36 are aligned in the direction of the axis of rotation and are disposed circumferentially around the axis of rotation. However, the stator poles in each segment are offset from each other in the axial direction. The shifted positions of the pole faces with respect to axially aligned base portions of the segment can be formed from soft magnetically permeable medium such as powdered metal materials that can be molded to the desired shape.

As in the arrangement of FIG. 5, during motor operation the rotor traverses a horizontal path with respect to the stationary stator segments. The alignment transitional points between rotor magnets and stator poles of a corresponding rotor ring/stator pole set occur at positions along the circumference and at times that are different from points of transition in each of the other sets of corresponding rotor and stator elements. Each set produces a similar time varying cogging torque but shifted from the others in dependence upon the offset of the stator poles. The dimensions of the stator poles of each core segment can differ from each other, as can the dimensions of the surfaces of the rotor magnets. The degree of offset can be appropriately selected for optimum cancellation of the combing cogging torques.

Figure 7:
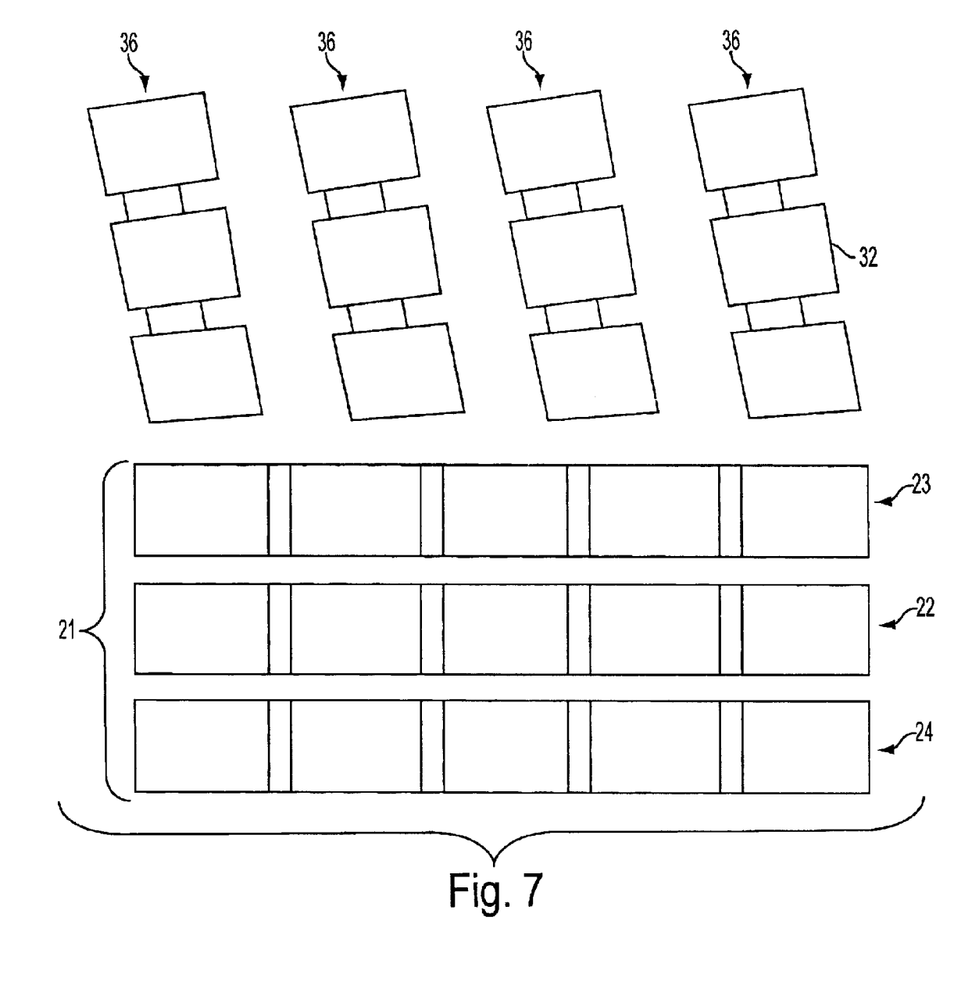
FIG. 7 is a partial plan layout of stator pole and rotor permanent magnet surfaces of a motor in accordance with the present invention and a variation of the arrangement of FIG. 6.

FIG. 7 is a partial plan layout of stator pole and rotor permanent magnet surfaces of a motor in accordance with the present invention and a variation of the arrangement of FIG. 6. The rotor magnets in adjacent rings 22–24 have substantially the same surface dimensions and are in axial alignment with each other. The stator poles of each stator segment 36 are aligned with each other and the core base supporting portion. However, the stator segments 36 are skewed with respect to the axis of rotation. Displacement by a specific offset angle of the stator segment from the axis shifts the alignment transitional points between rotor magnets and stator poles of a corresponding rotor ring/stator pole set from the transitional points in each of the other sets of corresponding rotor and stator elements, as in the arrangement of FIG. 6.

In operation, as in the previously described variations of the invention, the three sets of rotor and stator elements have substantially the same surface configurations so that each set produces a similar time varying cogging torque. As the cogging torques produced by the individual sets are shifted from each in dependence on the offset of the poles of the stator segments incident to the skewed relationship, the cogging torques to an extent cancel each other. In addition, the cogging torque produced by each of the sets is diminished by virtue of the skewed relationship between the stator poles and corresponding rotor magnets. The leading edge of a magnet approaching a stator pole across the air gap will not immediately overlap the entire edge of the stator pole as the edges are out of parallel relationship to each other by the skew angle of the stator pole. Thus, the change in cogging torque at the transitional points when a rotor magnet approaches overlapping relationship with a stator pole across the air gap is more gradual than the torque change in the previously discussed arrangements. Cogging torque oscillations are thereby diminished. Reference is made to copending application for a more detailed explanation of advantageous effects of a skewed arrangement. The embodiment of FIG. 7 provides the benefits of both shifted and skewed relationships between rotor and stator elements. Similar effects can be obtained from variations in which the stator poles of each segment are aligned in the axial direction and the rotor magnets are shifted as well as skewed with respect to the stator poles.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, each of the layouts illustrated in the drawings can be implemented with unitary, instead of segmented, stator cores that are axially spaced from each other with beneficial results.

While specific geometric configurations of the stator core elements have been illustrated, it should be recognized that the inventive concept herein encompasses a multitude of variations of these configurations as virtually any shape can be formed using the powder metal technology. Thus a specific core configuration can be tailored to the flux distribution desired.

Although the description of the present invention depicts the stator surrounded by the rotor, the concepts of the invention are equally applicable to motors in which the rotors are surrounded by stators.

What is claimed is:

1. A rotary permanent magnet electric motor comprising:
   a stator comprising a plurality of separated, ferromagnetically isolated, electromagnet core segments disposed coaxially about an axis of rotation to form an annular cylindrical stator ring, each of the core segments comprising a plurality of poles integrally joined by a linking portion extending generally in the direction of the axis of rotation; and
   a cylindrical annular rotor concentric with the stator and spaced therefrom by a cylindrical annular air gap, said rotor comprising a plurality of permanent magnets having surfaces facing the air gap and forming axially spaced rings of separated magnets disposed circumferentially along the air gap, the number of said rings being equal in number to the number of stator poles in a stator core segment;
   wherein the poles of each stator core segment are offset from each other in the axial direction.

2. A rotary permanent magnet electric motor as recited in claim 1, wherein the plurality of rotor permanent magnets are aligned in axial rows disposed circumferentially along the air gap.

3. A rotary permanent magnet electric motor as recited in claim 2, wherein the poles of the stator core segments and rotor permanent magnets have a common geometric configuration at their air gap surfaces.

4. A rotary permanent magnet electric motor as recited in claim 1, wherein the stator core segments are affixed to a non-ferromagnetic support structure and distributed in the stator ring without ferromagnetic contact with each other.

5. A rotary permanent magnet electric motor as recited in claim 2, wherein a winding is formed on the linking portion to develop, when energized with current, magnetic poles of opposite polarity in adjoining stator poles.

6. A rotary permanent magnet electric motor as recited in claim 5, wherein each rotor permanent magnet is of an opposite magnetic polarity to the magnetic polarity of adjacent permanent magnets in its respective ring and axial row.

7. A rotary permanent magnet electric motor as recited in claim 6, wherein each permanent magnet is a magnetic dipole having one magnetic polarity at the surface facing the air gap and the opposite magnetic polarity at a surface facing away from the air gap, thereby forming a magnetic polar orientation in a direction perpendicular to the air gap.

8. A rotary permanent magnet electric motor as recited in claim 1, wherein the electromagnet core segments are formed of powdered metal material.

9. A rotary permanent magnet electric motor as recited in claim 2, wherein the stator core segment poles have a common surface geometric configuration at the air gap and the permanent magnet surfaces have a common geometric configuration different from the stator pole surface geometric configuration.

10. A rotary electric motor as recited in claim 1, wherein each stator pole has surface geometric configuration that is skewed with respect to the axis of rotation.

11. A rotary permanent magnet electric motor comprising:
    a stator comprising a plurality of separated, ferromagnetically isolated, electromagnet core segments disposed coaxially about an axis of rotation to form an annular cylindrical stator ring, each of the core segments comprising a plurality of poles integrally joined by a linking portion extending generally in the direction of the axis of rotation; and
    a cylindrical annular rotor concentric with the stator and spaced therefrom by a cylindrical air gap, said rotor comprising a plurality of permanent magnets having surfaces facing the air gap and forming axially spaced rings of separated magnets disposed circumferentially along the air gap, the number of said rings being equal in number to the number of stator poles in a stator core segment;
    wherein the permanent magnets in adjacent rings are offset from each other in the axial direction.

12. A rotary permanent magnet electric motor as recited in claim 11, wherein the stator poles of each core segment are aligned in the axial direction.

13. A rotary permanent magnet electric motor as recited in claim 11, wherein the electromagnet core segments are formed of powdered metal material.

14. A rotary permanent magnet electric motor as recited in claim 13, wherein the stator core segment poles have a common surface geometric configuration at the air gap and the permanent magnet surface have a common geometric configuration different from the stator pole surface geometric configuration.

* * * * *